(12) United States Patent
Tamura et al.

(10) Patent No.: US 6,672,051 B2
(45) Date of Patent: Jan. 6, 2004

(54) EXHAUST EMISSION PURIFYING DEVICE FOR INTERNAL COMBUSTION ENGINE

(75) Inventors: Yasuki Tamura, Aichi (JP); Kazuhito Kawashima, Aichi (JP); Takuya Okamoto, Aichi (JP); Osamu Nakayama, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,037

(22) Filed: Mar. 30, 2001

(65) Prior Publication Data

US 2001/0045091 A1 Nov. 29, 2001

(30) Foreign Application Priority Data

Mar. 30, 2000 (JP) .......................... 2000-093619
Feb. 5, 2001 (JP) ........................ 2001-027661

(51) Int. Cl.⁷ ................................. F01N 3/00
(52) U.S. Cl. ............... 60/285; 60/274; 60/277; 60/278; 60/286; 60/289
(58) Field of Search ............... 60/274, 276, 277, 60/278, 285, 286, 289, 295, 303

(56) References Cited

U.S. PATENT DOCUMENTS

| | | | | |
|---|---|---|---|---|
| 5,155,994 A | * | 10/1992 | Muraki et al. ............... 60/278 |
| 5,373,696 A | * | 12/1994 | Adamczyk, Jr. et al. ...... 60/289 |
| 5,743,085 A | * | 4/1998 | Takaku et al. ............... 60/277 |
| 5,771,685 A | * | 6/1998 | Hepburn ...................... 60/277 |
| 5,782,087 A | * | 7/1998 | Kinugasa et al. ............ 60/285 |
| 5,839,275 A | * | 11/1998 | Hirota et al. ................ 60/285 |
| 5,974,793 A | * | 11/1999 | Kinugasa et al. ............ 60/285 |
| 6,085,517 A | * | 7/2000 | Bayerle et al. .............. 60/289 |
| 6,089,017 A | * | 7/2000 | Ogawa et al. ................ 60/277 |
| 6,119,452 A | * | 9/2000 | Kinugasa et al. ............ 60/285 |
| 6,141,960 A | * | 11/2000 | Takami et al. ............... 60/286 |
| 6,185,933 B1 | * | 2/2001 | Tsuzuki et al. .............. 60/285 |
| 6,233,925 B1 | * | 5/2001 | Hirota et al. ................ 60/285 |
| 6,244,043 B1 | * | 6/2001 | Farmer et al. ............... 60/274 |

FOREIGN PATENT DOCUMENTS

JP  8-014029 A  1/1996

* cited by examiner

*Primary Examiner*—Thomas Denion
*Assistant Examiner*—Tu M. Nguyen
(74) *Attorney, Agent, or Firm*—Birch, Stewart, Kolasch & Birch, LLP

(57) ABSTRACT

When exhaust gases flowing into catalysts (e.g., a NOx catalyst and a three-way catalyst) continue to be in the fuel-rich atmosphere for a predetermined period of time or longer, an exhaust emission purifying device for an internal combustion engine leans an air-fuel mixture or supplies the secondary air to the exhaust gases in order to turn the exhaust gases flowing into catalysts into an oxygen-rich atmosphere. This enables the proper regeneration of the degraded catalysts, and thus improves an exhaust emission control performance.

17 Claims, 3 Drawing Sheets

EXHAUST EMISSION PURIFYING DEVICE FOR INTERNAL COMBUSTION ENGINE

CROSS REFERENCE

This application claims the benefit of Japanese Application Nos. 2000-093619, filed on Mar. 30, 2000, and 2001-027661, filed on Feb. 5, 2001, which are hereby incorporated by reference.

BACKGROUND OF THE INVENTION

1. Field of the Invention

The present invention relates to an exhaust emission control device for an internal combustion engine, in which exhaust emission purifying catalysts for purifying toxic substances in exhaust gases are disposed in an exhaust passage of the internal combustion engine.

2. Description of Related Art

Ordinarily, an exhaust system of an internal combustion engine is provided with a three-way catalyst that purifies carbon monoxide (hereinafter referred to as CO), hydrocarbon (hereinafter referred to as HC), and nitrogen oxide (hereinafter referred to as NOx) in exhaust gases as disclosed in Japanese Patent Publication No. 8-14029.

In an "exhaust emission control device" disclosed in the above publication, an upstream catalyst and a downstream catalyst comprised of a three-way catalyst are disposed in an exhaust passage of the engine. The upstream catalyst oxidizes the CO and the HC in exhaust gases at an inflow side thereof, and oxidizes the CO and reduces the NOx at an outflow side thereof; whereas the downstream catalyst oxidizes the CO and reduces the NOx. This improves an oxidation-reduction capability of the catalysts and activates the exhaust gases.

The above "exhaust emission control device," however, has a disadvantage that a catalytic reaction may degrade according to an operational status of the internal combustion engine, a catalyst temperature, a change due to passage of time, and the like. The degradation of the catalytic reaction results in the degradation of an exhaust emission purifying reaction. It is, therefore, impossible to achieve a stable exhaust emission control performance.

SUMMARY OF THE INVENTION

It is, therefore, an object of the present invention to provide an exhaust emission control device for an internal combustion engine, the device which properly regenerates degraded catalysts to improve an exhaust emission control performance.

To attain the above object, the present invention provides an exhaust emission purifying device for an internal combustion engine, the device comprising: exhaust emission purifying catalysts for purifying toxic substances in exhaust gases, the exhaust emission purifying catalysts being disposed in an exhaust passage of the internal combustion engine; and a control unit for temporarily turning the exhaust gases flowing into the exhaust emission purifying catalysts into oxide atmosphere if the exhaust gases flowing into the exhaust emission purifying catalysts are turned into reduced atmosphere and continue to be the reduced atmosphere for a predetermined reference period of time or longer.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will hereunder be described in further detail with reference to the accompanying drawings.

Figure 1:
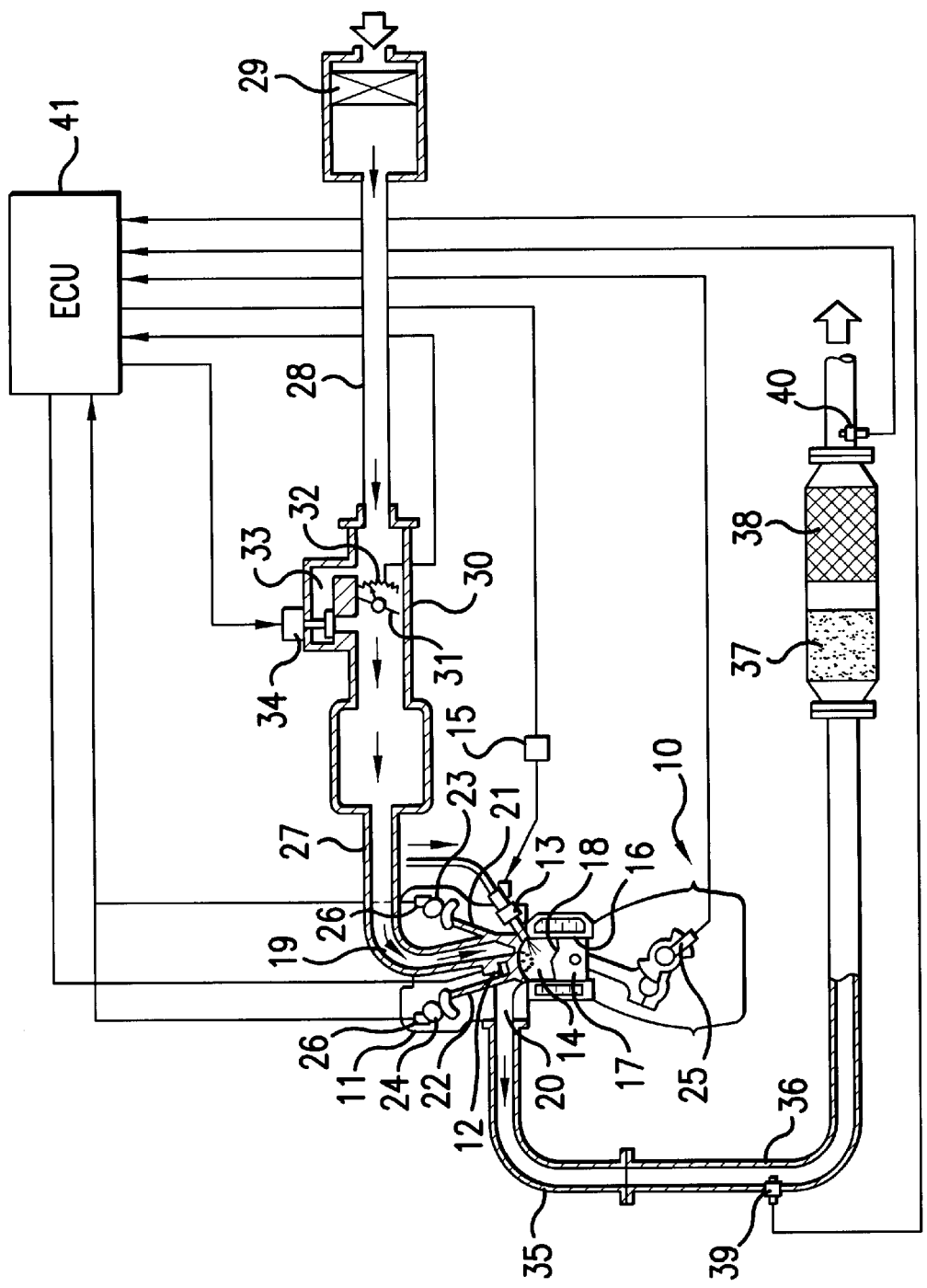
FIG. 1 is a schematic diagram showing a direct injection type internal combustion engine, to which an exhaust emission purifying device of an internal combustion engine according to an embodiment of the present invention is applied.

The exhaust emission purifying device for the internal combustion engine according to the present embodiment is constructed as follows. An engine 10 is a direct injection type in-line gasoline engine, which injects fuel directly into a combustion chamber. An ignition plug 12 and an injector 13 are attached to a cylinder head 11 of each cylinder. The injector 13 has an injection port in the combustion chamber 14, so that the fuel from the injector 13 can be injected directly into the combustion chamber 14 through the injection port. An ECU41 (later-described) controls the fuel injection from the injector 13 by a driver 15. A cylinder 16 of the engine 10 supports a piston 17 in such a manner as to allow the piston 17 to slide vertically. A cavity 18, which is concaved in a semispherical shape, is formed in the top face of the piston 17. The intake air flowing into the combustion chamber 14 flows along a wall of the cylinder 16 through a later-described intake port 19, and is then inverted by the cavity 18. In other words, a swirl flow is generated in a clockwise direction in FIG. 1.

The intake port 19 and an exhaust port 20, which face the combustion chamber 14, are formed in the cylinder head 11. The intake port 19 is opened and closed by driving an intake valve 21, whereas the exhaust port 20 is opened and closed by driving an exhaust valve 22. A camshaft 23 at an intake side and a camshaft 24 at an exhaust side are rotatably supported at the top of the cylinder head 11. The rotation of the camshaft 23 at the intake side drives the intake valve 21, and the rotation of the camshaft 24 at the exhaust side drives the exhaust valve 22.

The exhaust emission purifying device has a vane crank angle sensor 25, which outputs a crank angle signal SGT at a predetermined crank position of each cylinder. The crank angle sensor 25 is capable of detecting an engine revolution speed. The camshafts 23, 24 rotate at a half the revolutionary speed as compared to a crank shaft, and each one of them is provided with an identification sensor 26 that outputs a cylinder identification signal SGC. On the basis of the cylinder identification signal SGC, it is possible to identify a cylinder relating to the outputted crank angle signal SGT.

The intake port 19 is connected to an intake pipe 28 through an intake manifold 27, and an air cleaner 29 is disposed at an air inlet of the intake pipe 28. The intake pipe 28 is provided with a throttle body 30, which has a butterfly throttle valve 31 for opening and closing a passage and a throttle position sensor 32 for detecting the angle of the throttle valve 31. The throttle position sensor 32 outputs a throttle voltage corresponding to the opening angle of the throttle valve 31. The throttle valve 31 opening angle can be recognized according to the throttle voltage.

The throttle body 30 has a bypass channel 33, into which the intake air flows while bypassing the throttle valve 31 when the engine is idling. The bypass channel 33 is provided with an idle speed control valve 34, which opens and closes the bypass channel 33.

On the other hand, the exhaust port 20 is connected to an exhaust pipe 36 through an exhaust manifold 35. A NOx catalyst 37 and a three-way catalyst 38 for purifying toxic substances in exhaust gases are disposed downstream of the exhaust pipe 36. An $O_2$ sensor 39 is provided upstream of the NOx catalyst 37, and a NOx sensor 40 is provided downstream of the three-way catalyst 38. An exhaust muffler, not shown, is disposed downstream of the NOx sensor 40.

A vehicle is equipped with an electronic control unit (hereinafter referred to as ECU) 41 as a control unit. The ECU 41 includes an input/output device; a storage device for containing a control program, a control map and so forth; a central processing unit; and a variety of devices such as a timer and a counter. The ECU 41 totally controls the direct injection type engine 10. More specifically, the ECU 41 receives sensor information from the above-mentioned sensors 25, 26, 32, 39, 40.

According to the sensor information from these sensors, the ECU 41 determines a fuel injection mode, a fuel injection volume, an ignition period and the like in order to control the driver 15 of the injector 13, the ignition plug 12, the idle speed control valve 34 and the like.

There will now be described the operation of the direct injection type engine 10 that is constructed in the above-mentioned manner. When air is drawn into the combustion chamber through the intake port 19 and the injector 13 injects fuel into the combustion chamber 14, a swirl flow of fuel spray is formed in the combustion chamber 14. Ignition of the fuel spray in the swirl flow by the ignition plug 12 rotates the engine, and an intake stroke, a compression stroke, a combustion and expansion stroke, and an exhaust stroke are repeated. The exhaust gases generated in the combustion chamber 14 flow out of the exhaust port and into the exhaust pipe 36 via the exhaust manifold 35. The NOx catalyst 37 and the three-way catalyst 38 purify the toxic substances such as CO, HO, and NOx, and the exhaust muffler muffles the sound of escaping gases, and are then discharged into the air.

The catalytic reaction of the NOx catalyst 37 and the three-way catalyst 38 may be degraded according to an operational status of the engine 10, a catalyst temperature, changes in characteristic or performance due to aging and so forth. The degradation of the catalytic reaction causes deterioration of the exhaust emission purifying performance. One of the main causes for the deterioration of the exhaust emission purifying performance is that the exhaust gases flowing into the catalysts continue to be a fuel-rich atmosphere (i.e., an exhaust air-fuel ratio is stoichiometric or rich). For example, the three-way catalyst carries noble metal such as platinum, palladium, and rhodium on its surface in order to improve an oxidation and reduction capability. If the exhaust gases are in the fuel-rich atmosphere, CO is absorbed by the surface of the noble metal and makes it impossible to reduce NOx.

To address this problem, the exhaust emission purifying device for the internal combustion engine according to the present embodiment is provided with a fuel-rich atmosphere continuation index detecting device, which detects an index relating to the continuation of a state wherein the exhaust gasses flowing into the NOx catalyst 37 and the three-way catalyst 38 are the fuel-rich atmosphere. A predetermined reference value for the fuel-rich atmosphere continuation index is stored in the ECU 41. For example, the reference value is experimentally set to such a value that has no possibility of causing the above-stated degradation of the catalytic reaction. The ECU 41 also has an exhaust air-fuel ratio control portion that controls an engine parameter to turn the exhaust gases flowing into the NOx catalyst 37 and the three-way catalyst 38 into oxide atmosphere if the fuel-rich atmosphere continuation index exceeds the reference value to such a degree that the continuation of the fuel-rich atmosphere may cause the degradation of the catalytic reaction. The ECU 41 also has an oxygen-rich atmosphere continuation index detecting device that detects an index relating to the continuation of a state wherein the exhaust gases are in an oxygen-rich atmosphere. According to the detected oxygen-rich atmosphere continuation index, the ECU 41 controls a period of time that the exhaust gases continue to be in the oxygen-rich atmosphere. The ECU 41 also has a reducing agent supply control part that controls to supply a reducing agent to the exhaust gases when the exhaust gases are in the fuel-rich atmosphere.

The fuel-rich atmosphere continuation index detecting device detects at least one of the following as the fuel-rich atmosphere continuation index: the duration of an operation at the stoichiometric or rich air-fuel ratio, the mileage that the vehicle runs at the stoichiometric or rich air-fuel ratio, the total flow of exhaust gases passing through the catalysts during the operation at the stoichiometric or rich air-fuel ratio, the catalyst temperature during the operation at the stoichiometric or rich air-fuel ratio, the total amount of CO flowing into the catalysts during the operation at the stoichiometric or rich air-fuel ratio, the total amount of $O_2$ flowing into the catalysts during the operation at the stoichiometric or rich air-fuel ratio, the amount of CO poisoning the catalysts during the operation at the stoichiometric or rich air-fuel ratio, the amount of inactive catalysts during the operation at the stoichiometric or rich air-fuel ratio, and other parameters correlated thereto. The fuel-rich atmosphere continuation index is in inverse proportion to the total amount of $O_2$, which flows into the catalysts during the operation at the stoichiometric or rich air-fuel ratio. On the other hand, the fuel-rich atmosphere continuation index is in proportion to the other parameters mentioned above. The amount of inactive catalysts is found by measuring or estimating an emission purifying performance of the catalysts. For example, the purifying performance is estimated by measuring or estimating the HC, CO, or NOx concentration before and after they flow into the catalysts, or by finding a difference in temperature between the catalysts and the exhaust gases flowing into the catalysts. The reason why the purifying performance is estimated from the difference in temperature is that the catalyst temperature is higher than the temperature of the exhaust gases flowing into the catalysts by a reaction heat of the catalysts.

The oxygen-rich atmosphere continuation index detecting means detects at least one of the following as the oxygen-rich atmosphere continuation index: the duration of an operation at a lean air-fuel ratio, the mileage that the vehicle runs at the lean air-fuel ratio, the total flow of exhaust gases passing through the catalysts during the operation at the lean air-fuel ratio, the catalyst temperature during the operation at the lean air-fuel ratio, the total amount of CO flowing into the catalysts during the operation at the lean air-fuel ratio, the total amount of $O_2$ flowing into the catalysts during the operation at the lean air-fuel ratio, the amount of CO poisoning the catalysts during the operation at the lean air-fuel ratio, the amount of inactive catalysts during the operation at the lean air-fuel ratio, and other parameters correlated thereto. The oxygen-rich atmosphere continuation index is in inverse proportion to the total amount of CO flowing into the catalysts during the operation at the lean air-fuel ratio and the amount of CO poisoning the catalysts during the operation at the lean air-fuel ratio. On the other hand, the oxygen-rich atmosphere continuation index is in direct proportion to the other parameters mentioned above.

The reducing agent supply control portion drives the injector 13 to supply fuel injection into the combustion chamber 14. In addition, the reducing agent supply control portion drives the injector 13 to perform a sub injection in an expansion stroke or an exhaust stroke following the main injection.

Figure 2:
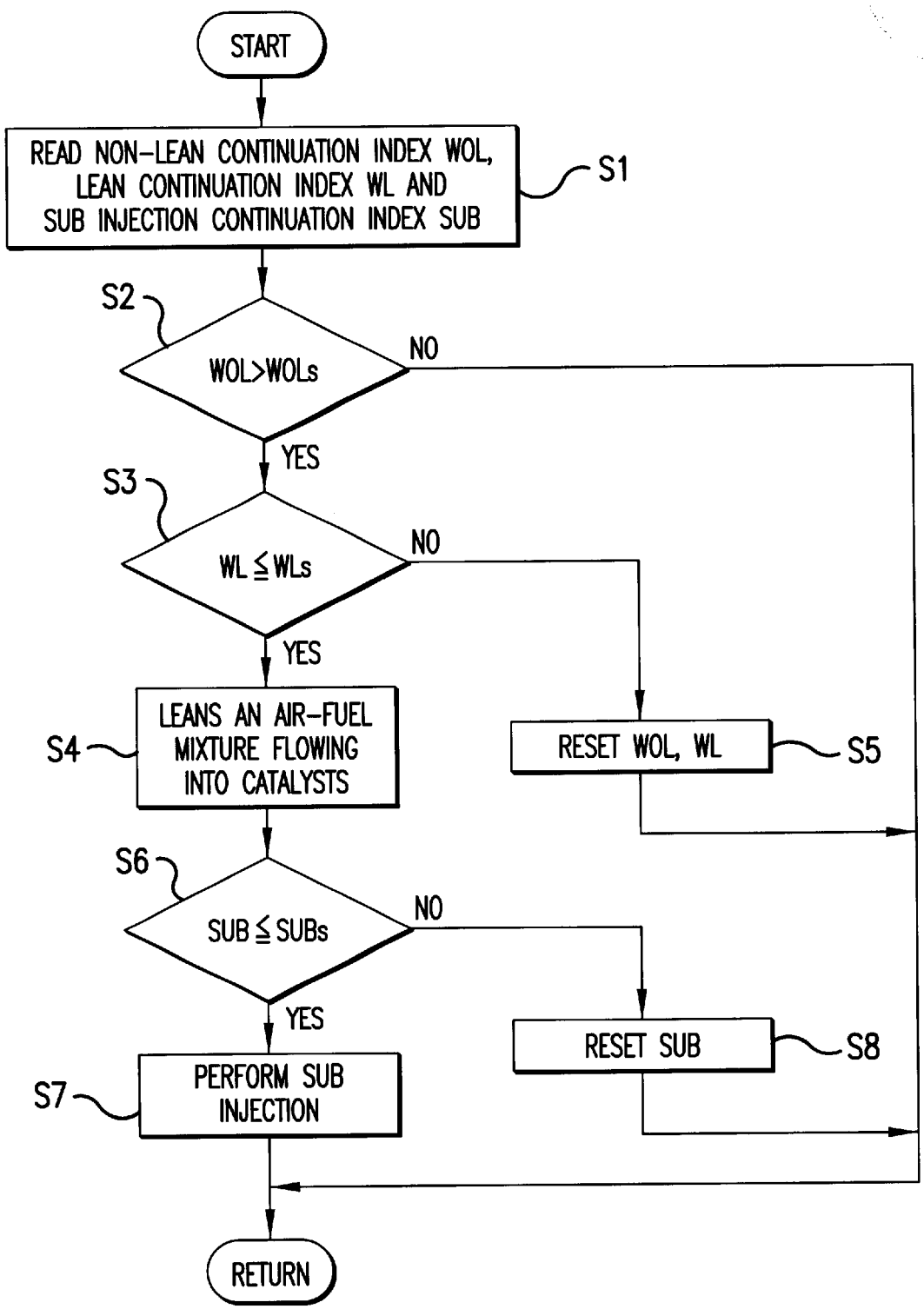
FIG. 2 is a flow chart showing the control executed by the exhaust emission purifying device for the internal combustion engine according to the embodiment of the present invention.

Referring now to a flow chart shown in FIG. 2, there will now be described the procedure for regenerating the catalysts by the exhaust emission control device for the internal combustion engine according to the present embodiment.

In the first step S1, the ECU 41 reads a non-lean continuation index WOL as the fuel-rich atmosphere continuation index, a lean continuation index WL as the oxygen-rich atmosphere continuation index, and a sub injection continuation index SUB. In this case, for example, the duration of the operation at the stoichiometric and rich air-fuel ratios is used as the non-lean continuation index WOL, the operation at the lean air-fuel ratio is used as the lean continuation index WL, and the fuel injection period in the expansion stroke or the exhaust stroke is used as the sub injection continuation index SUB.

In the next step S2, it is determined whether the non-lean continuation index WOL (e.g., the duration of the operation at the stoichiometric and rich air-fuel ratios) is greater than a criterion WOLs thereof (for example, 30 seconds). If not, the process leaves this routine. If yes, the process goes to step S3. In step S3, it is determined whether the lean continuation index WL (e.g., the duration of the operation at the lean air-fuel ratio) is not greater than a criterion WLs thereof (e.g., 0.5 second). The criteria WOS and WLs may be fixed values, but more preferably, they are functions such as the mileage of the vehicle and the duration of the operation at the stoichiometric or rich (lean) air-fuel ratio as is the case with the indexes WOL and WL.

If the lean continuation index WL is determined as being not greater than the criterion WLs (YES) in step S3, the exhaust air-fuel ratio control portion forcedly leans an air-fuel mixture in step 54. In this case, it is preferable to correct an exhaust air-fuel ratio, an ignition timing, an ignition period and the like or set a tailing coefficient for each of them in order to prevent deterioration of drivability.

If the lean continuation index WL is determined as being greater than the criterion WLs (NO) in step S3, the non-lean continuation index WOL and the lean continuation index WL are reset (to zero) and the process returns to step S1.

If the exhaust air-fuel ratio control portion is forcedly leaning the air-fuel mixture flowing into the NOx catalyst 37 and the three-way catalyst 38 in step S4, the non-lean continuation index WOL and the lean continuation index WL are reset and the forcedly-leaning action executed by the exhaust air-fuel ratio control part is canceled at the same time.

After the exhaust air-fuel ratio control portion forcedly leans the air-fuel mixture in step S4, it is determined in step SG whether the sub injection continuation index SUB (e.g., a sub injection period) is not greater than a criterion SUBs thereof (e.g., 0.5 second). If the sub injection continuation index SUB is not greater than the criterion SUBs, the sub injection is performed in step S7. This prevents the shortage of CO. THC (total Hydrocarbon. THC is a general term of HC compounds, and HC is one of HC compounds), and $H_2$, i.e., the instantaneous increase in the amount of emission NOx (NOx spike), which is caused by an action of turning the exhaust gases into the oxygen-rich atmosphere while the catalytic reaction has a tendency of deteriorating.

According to the present embodiment, the sub injection is performed when the exhaust air-fuel ratio control portion forcedly leans the air-fuel mixture. To reduce the NOx more effectively, the sub injection is performed only when there is the possibility of the NOx spike.

As stated above, the sub injection is performed to supply the reducing agent to the exhaust gases in step S7. Alternatively, however, the amount of emission NOx may be reduced as follows. The ECU 41 controls an exhaust gas recirculation system to increase the amount of exhaust gas recirculation, and retards the ignition timing of the ignition plug 12, or the like. On the completion of step S7, the process returns to the step S1 to perform the subsequent steps. If it is determined in step S6 that the sub injection continuation index SUB is larger than a criterion SUBs thereof (NO), the sub injection continuation index SUB is reset (to zero) in step S8 and the process returns to step S1.

If it is determined in step S3 that the lean continuation index WL is larger than the criterion WLs before the sub injection continuation index SUB is determined as being larger than the criterion SUBs (before the sub injection continuation index SUB is reset in step S8); the non-lean continuation index WOL, the lean continuation index WL, and the sub injection continuation index SUB are reset in step S5. At the same time, the sub injection is ended.

Figure 3:
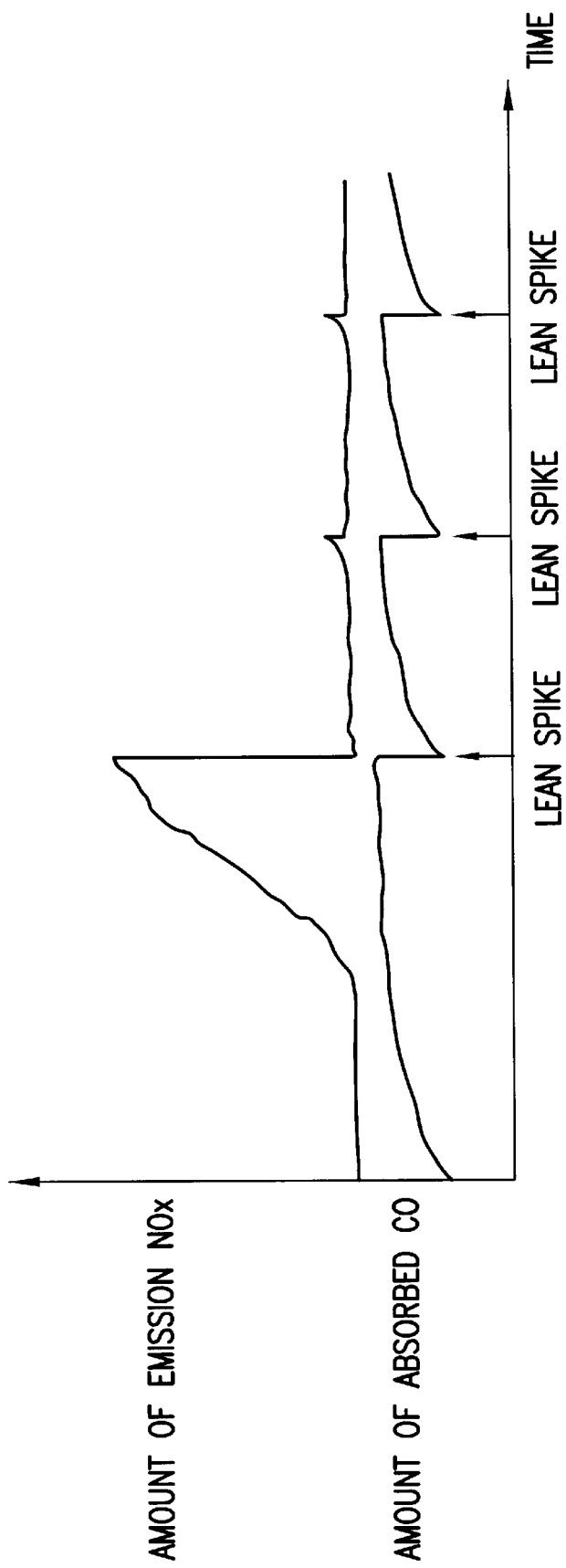
FIG. 3 is a time chart showing the amount of CO and NOx that are absorbed and emitted, respectively, by the exhaust emission purifying device for the internal combustion engine according to the embodiment of the present invention.

The process of regenerating the catalysts will now be described in further detail. As time passes, the amount of emission NOx and the amount of CO absorbed by the catalysts increase at the downstream side of the NOx catalyst 37 and the three-way catalyst 38 as shown in FIG. 3. For this reason, the execution of a lean spike (leaning the air-fuel mixture flowing into the catalysts) immediately decreases the amount of emission NOx and the amount of CO absorbed by the catalysts. Thus, the supply of $O_2$ dissociates the CO absorbed by the noble metal of the catalysts and properly reduces NOx.

As stated above, the exhaust emission control device for the internal combustion engine according to the present invention leans the air-fuel mixture flowing into the NOx catalyst 37 and the three-way catalyst 38 if the operation at the non-lean air-fuel ratio has continued for a predetermined period of time. This enables the immediate regeneration of the catalysts, and thus prevents the degradation of the catalytic reaction.

According to the present embodiment, the interval between the lean spikes is changed according to the duration of the operation at the stoichiometric and rich air-fuel ratios as the non-lean continuation index WOL. Alternatively, however, the total amount of CO flowing into the catalysts during the operation at the stoichiometric and rich air-fuel ratios may also be used as the non-lean continuation index WOL. In this case, the air-fuel ratio during the operation at the non-lean air-fuel ratio is used as a parameter correlated to the total amount of CO flowing into the catalysts because a richness level of the air-fuel ratio during the operation at the non-lean air-fuel ratio is correlated to the CO concentration. More specifically, the CO concentration is estimated from the richness level of the air-fuel ratio during the operation at the non-lean air-fuel ratio to be found the non-lean continuation index WOL. As a result, the degree of change in the non-lean continuation index WOL varies according to the richness level of the air-fuel ratio, and thus, the interval between the lean spike is changed as in the case where the duration of the operation at the stoichiometric and rich air-fuel ratios is used as the non-lean continuation index WOL.

Moreover, the catalyst temperature during the operation at the stoichiometric and rich air-fuel ratios may also be selected as the non-lean continuation index WOL. In this case, a catalyst surface is further activated with the increase in the catalyst temperature, so that the CO can be easily absorbed by the catalyst surface. Thus, the higher the catalyst temperature is, the larger is the degree of change in the non-lean continuation index WOL and the shorter is the interval between the lean spikes.

Further, the amount of CO poisoning the catalysts during the operation at the stoichiometric and rich air-fuel ratios is selected as the non-lean continuation index WOL. The amount of CO poisoning the catalysts can be found by using an output from an exhaust air-fuel ratio sensor disposed downstream of the catalysts as a parameter correlated to the amount of CO poisoning the catalysts. More specifically, when an amplitude of the output from the exhaust air-fuel ratio sensor is not smaller than a predetermined value or if a change in the output is not smaller than a predetermined value (the criterion WOLs), the amount of poisoning CO is determined as being not smaller than a predetermined value.

According to the present embodiment, the duration of the lean spike in step S4 is fixed to, e.g., 0.5 second, but it may be varied according to the lean continuation index WL. For example, if the total amount of $O_2$ flowing into the catalysts during the operation at the lean air-fuel ratio is selected as the lean continuation index WL, the air-fuel ratio during the operation at the lean air-fuel ratio is used as a parameter correlated to the total amount of $O_2$ flowing into the catalysts because a leanness level of the air-fuel ratio during the operation at the lean air-fuel ratio. More specifically, the $O_2$ concentration is estimated from the leanness level of the air-fuel ratio during the operation at the lean air-fuel ratio to be found as the lean continuation index WL. As a result, the degree of change in the lean continuation index WL varies according to the leanness level of the air-fuel ratio, and thus, the duration of the lean spike is changed accordingly.

According to the present embodiment, the exhaust air-fuel ratio control portion leans the air-fuel mixture emitted from the internal combustion engine to thereby lean the air-fuel mixture flowing into the NOx catalyst 37 and the three-way catalyst 38. Alternatively, however, a secondary air system may be provided upstream of the NOx catalyst 37 and the three-way catalyst 38 to supply the air to the exhaust gases in order to lean the air-fuel mixture flowing into the NOx catalyst 37 and the three-way catalyst 38. In this case, if the total flow of exhaust gases flowing into the catalysts during the operation at the lean air-fuel ratio is used as the oxygen-rich atmosphere continuation index, the total flow of exhaust gases flowing into the catalysts includes the flow of the air that is supplied to the exhaust gases by the secondary air system.

According to the above embodiment, there are provided the NOx catalyst 37 and the three-way catalyst 38 to purify the exhaust gases, but it is possible to provide only the three-way catalyst 38. Moreover, the engine 10 is the direct injection type gasoline engine according to the above embodiment, but the engine 1 may also be a different type of engine, which supplies a mixture of the air and the gasoline to the combustion chamber.

Further, it is possible to omit the sub injection of the above embodiment. On the other hand, when there is a possibility that the NOx will not be purified due to the shortage of CO, THC, and $H_2$ in the exhaust gases because the engine continues operating at the lean air-fuel ratio, it is possible to purify the NOx by performing the sub injection and supplying the reducing agent.

It should be understood, however, that there is no intention to limit the invention to the specific forms disclosed, but to the contrary, the invention is to cover all modifications, alternate constructions and equivalents falling within the spirit and scope of the invention as expressed in the appended claims.

What is claimed is:

1. An exhaust emission purifying device for an internal combustion engine, comprising:
    an exhaust emission purifying catalyst for purifying toxic substances in exhaust gases, said exhaust emission purifying catalyst being disposed in an exhaust passage of the internal combustion engine;
    a control unit for temporarily switching the exhaust gases, flowing upstream of said exhaust emission purifying catalyst, into an oxygen-rich atmosphere when the exhaust gases flowing upstream of said exhaust emission purifying catalyst continue to be a fuel-rich atmosphere; and
    a reducing agent supply control device for controlling supply of a reducing agent to the exhaust gases,
    wherein said reducing agent supply control device controls supply of said reducing agent to the exhaust gases when said control unit switches the exhaust gases into the oxygen-rich atmosphere.

2. An exhaust emission purifying device for an internal combustion engine according to claim 1, wherein:
    said reducing agent supply control device controls supply of said reducing agent to the exhaust gases by injecting fuel in at least one of an expansion stroke and an exhaust stroke of the internal combustion engine.

3. A method of recovering an exhaust emission purifying device for an internal combustion engine, comprising:
    performing fuel-rich atmosphere state in exhaust gases which flow into the exhaust emission purifying device;
    determining that the reaction of said exhaust emission purifying device has degraded by said performing step;
    switching said exhaust gases from fuel-rich atmosphere to oxygen-rich atmosphere; and
    increasing a reducing agent in said exhaust gases at least in said switching step.

4. The method of claim 3, wherein said increasing step includes the step of injecting fuel in at least one of an expansion stroke and exhaust stroke of said internal combustion engine.

5. An exhaust emission purifying device for an internal combustion engine, comprising:
    an exhaust emission purifying catalyst for purifying toxic substances in exhaust gases, said exhaust emission purifying catalyst being disposed in an exhaust passage of the internal combustion engine;
    a fuel-rich atmosphere continuation index detecting device that detects a fuel-rich atmosphere continuation index indicative of an inverse proportion to a total amount of oxygen which flows into the catalyst during an operation in at least one of a stoichiometric and rich air-fuel ratio; and an oxygen-rich atmosphere continuation index detecting device that detects an oxygen-rich atmosphere continuation index indicative of a total amount of oxygen flowing into the catalyst during an operation in a lean air-fuel ratio;

a control unit for temporarily switching the exhaust gases, flowing upstream of said exhaust emission purifying catalyst, into an oxygen-rich atmosphere when said detected fuel-rich atmosphere continuation index exceeds a first value and said detected oxygen-rich atmosphere continuation index exceeds a second value such that said control unit controls frequency of switching to the oxygen-rich atmosphere as a function of the ability of the oxygen-rich atmosphere to regenerate said exhaust emission purifying catalyst.

6. An exhaust emission purifying device for an internal combustion engine according to claim 5, wherein:

said control unit has an exhaust air-fuel ratio control portion for leaning an air-fuel ratio of the exhaust gases emitted from said internal combustion engine by controlling a parameter of said internal combustion engine.

7. An exhaust emission purifying device for an internal combustion engine according to claim 5, further comprising:

a secondary air system for supplying air to the exhaust gases flowing upstream of said exhaust emission purifying catalyst, wherein said control unit controls said secondary air system to switch the exhaust gases, flowing into said exhaust emission purifying catalyst, into the oxygen-rich atmosphere.

8. An exhaust emission purifying device for an internal combustion engine according to claim 5, further comprising:

an exhaust gas recirculation device for recirculating a part of the exhaust gases flowing in said exhaust passage into an intake passage of the internal combustion engine, wherein said control unit controls said exhaust gas recalculating device to increase an exhaust gas recirculation of the internal combustion engine to switch the exhaust gases, flowing into said exhaust emission purifying catalyst, into the oxygen-rich atmosphere.

9. An exhaust emission purifying device for an internal combustion engine according to claim 5, further comprising:

an ignition plug provided in each cylinder of the internal combustion engine, wherein said control unit retards an ignition timing of said ignition plug to switch the exhaust gases, flowing into said exhaust emission purifying catalyst, into the oxygen-rich atmosphere.

10. An exhaust emission purifying device for an internal combustion engine according to claim 5, wherein:

said first value is a criterion as a reference period of time.

11. An exhaust emission purifying device for an internal combustion engine according to claim 5, wherein:

said fuel-rich atmosphere continuation index detecting device detects at least one of a duration of an operation at a stoichiometric or rich air-fuel ratio, a mileage that a vehicle runs at the stoichiometric or rich air-fuel ratio, a total flow of exhaust gases passing through said catalyst during an operation at the stoichiometric or rich air-fuel ratio, a catalyst temperature during the operation at the stoichiometric or rich air-fuel ratio, a total amount of CO flowing into said catalyst during the operation at the stoichiometric or rich air-fuel ratio, a total amount of $O_2$ flowing into the catalyst during the operation at the stoichiometric or rich air-fuel ratio, an amount of CO poisoning the catalyst during the operation at the stoichiometric or rich air-fuel ratio, and an amount of inactive catalyst during the operation at the stoichiometric or rich air-fuel ratio.

12. An exhaust emission purifying device for an internal combustion engine according to claim 5, wherein:

said oxygen-rich atmosphere continuation index detecting device detects at least one of a duration of an operation at a lean air-fuel ratio, a mileage that a vehicle runs at the lean air-fuel ratio, a total flow of exhaust gases passing through said catalyst during the operation at the lean air-fuel ratio, a catalyst temperature during the operation at the lean air-fuel ratio, a total amount of CO flowing into said catalyst during the operation at the lean air-fuel ratio, a total amount of $O_2$ flowing into said catalyst during the operation at the lean air-fuel ratio, an amount of CO poisoning the catalyst during the operation at the lean air-fuel ratio, and an amount of inactive catalyst during the operation at the lean air-fuel ratio.

13. An exhaust emission purifying device for an internal combustion engine according to claim 5, wherein said control unit temporarily switches the exhaust gases flowing upstream of said exhaust purifying catalyst into the oxygen-rich atmosphere when the exhaust gases flowing upstream of said exhaust purifying catalyst are switched to a fuel-rich atmosphere at least for a predetermined period of time.

14. A method of recovering an exhaust emission purifying device for an internal combustion engine, comprising:

detecting a fuel-rich atmosphere continuation index indicative of an inverse proportion to a total amount of oxygen which flows into the catalyst during an operation in at least one of a stoichiometric and rich air-fuel ratio;

comparing said detected fuel-rich atmosphere continuation index with a first value;

detecting an oxygen-rich atmosphere continuation index indicative of a total amount of oxygen flowing into the catalyst during an operation in a lean air-fuel ratio;

comparing the detected oxygen-rich atmosphere continuation index with a second value; and switching said exhaust gases from fuel-rich atmosphere to oxygen-rich atmosphere when said detected fuel-rich atmosphere continuation index exceeds the first value and said detected oxygen-rich atmosphere continuation index exceeds the second value to regenerate a catalyst of the exhaust emission purifying device.

15. The method of claim 14, wherein said detecting step incorporates a factor of driver's demand.

16. The method of claim 14, wherein said detecting step includes at least one step of detecting:

a duration of an operation at a stoichiometric or rich air-fuel ratio; a distance that a vehicle runs at the stoichiometric or rich air-fuel ratio; total flow of exhaust gases passing through said exhaust emission purifying device during an operation at the stoichiometric or rich air-fuel ratio; a total amount of CO flowing into said exhaust emission purifying device during the operation at the stoichiometric or rich air-fuel ratio; a total amount of $O_2$ flowing into the exhaust emission purifying device during the operation at the stoichiometric or rich air-fuel ratio; an amount of CO poisoning the exhaust emission purifying device during the operation at the stoichiometric or rich air-fuel ratio; and an inactive state of the exhaust emission purifying device during the operation at the stoichiometric or rich air-fuel ratio.

17. The method of claim 14, wherein said detecting step includes at least one of detecting:

at least one of a duration of an operation at a lean air-fuel ratio, a mileage that a vehicle runs at the lean air-fuel ratio, a total flow of exhaust gases passing through said catalyst during the operation at the lean air-fuel ratio, a catalyst temperature during the operation at the lean air-fuel ratio, a total amount of CO flowing into said catalyst during the operation at the lean air-fuel ratio, a total amount of $O_2$ flowing into said catalyst during the operation at the lean air-fuel ratio, an amount of CO poisoning the catalyst during the operation at the lean air-fuel ratio, and an amount of inactive catalyst during the operation at the lean air-fuel ratio.

* * * * *